United States Patent
Geng et al.

(10) Patent No.: US 12,361,948 B2
(45) Date of Patent: Jul. 15, 2025

(54) ASYNCHRONOUS PIPELINE FOR ARTIFICIAL INTELLIGENCE SERVICE REQUESTS

(71) Applicant: Zoom Communications, Inc., San Jose, CA (US)

(72) Inventors: Haifeng Geng, Livermore, CA (US); Jian Jin, Mountain View, CA (US); Stephen Muchovej, Bishop, CA (US); Mengxiao Qian, San Jose, CA (US); Min Xiao-Devins, San Jose, CA (US); Fangyi Zhao, Fremont, CA (US)

(73) Assignee: Zoom Communications, Inc., San Jose, CA (US)

( * ) Notice: Subject to any disclaimer, the term of this patent is extended or adjusted under 35 U.S.C. 154(b) by 439 days.

(21) Appl. No.: 17/589,839

(22) Filed: Jan. 31, 2022

(65) Prior Publication Data
US 2023/0245658 A1    Aug. 3, 2023

(51) Int. Cl.
*G10L 15/26*   (2006.01)
*G06V 10/70*   (2022.01)
*H04L 12/18*   (2006.01)
*H04L 67/02*   (2022.01)

(52) U.S. Cl.
CPC ............. *G10L 15/26* (2013.01); *G06V 10/70* (2022.01); *H04L 12/1831* (2013.01); *H04L 67/02* (2013.01)

(58) Field of Classification Search
CPC ..... G10L 15/26; G06F 40/216; G06F 40/268; G06F 40/295; G06F 40/30; G06F 40/35
See application file for complete search history.

(56) References Cited

U.S. PATENT DOCUMENTS

| | | | |
|---|---|---|---|
| 10,417,058 B1* | 9/2019 | Kesler | G06F 9/448 |
| 10,997,195 B1* | 5/2021 | Sekar | G06N 20/00 |
| 11,671,535 B1* | 6/2023 | Petropoulos | H04M 3/42059 379/265.1 |
| 2006/0248112 A1* | 11/2006 | Williams | G06F 9/44505 707/999.102 |
| 2010/0228546 A1* | 9/2010 | Dingler | G09B 21/009 704/235 |
| 2019/0385711 A1* | 12/2019 | Shriberg | G09B 19/00 |
| 2021/0144517 A1* | 5/2021 | Guim Bernat | H04L 41/0869 |
| 2021/0234848 A1* | 7/2021 | Harris | H04W 12/06 |

* cited by examiner

*Primary Examiner* — Daniel C Washburn
*Assistant Examiner* — Paul J. Mueller
(74) *Attorney, Agent, or Firm* — Young Basile Hanlon & MacFarlane, P.C.

(57) ABSTRACT

Methods and systems provide an asynchronous pipeline for artificial intelligence service requests. In one embodiment, the system receives, at a gateway service, access to content associated with a communication session; sends, to an artificial intelligence (AI) cluster including a number of AI services, a data payload, the data payload including a location to access the content and a number of requests for AI services to be performed by one or more AI models hosted on the AI cluster using the content as an input; receives one or more AI service results as the AI cluster completes the corresponding requests for the AI services; and stores each received AI service result in one or more databases.

20 Claims, 7 Drawing Sheets

```
{
    "task_id": "string",
    "download_url": "s3://ceems-file-bucket-dev/replay/2021/09/08
/422aa593-4d5b-4d8c-8048-76889831f68A/GMT20210908-092751_Recording.
transcript.local.json",
    "meeting_id": "string",
    "host_id": "string",
    "account_id": "1K0byCOL8D69VCKsB2miwA",
    "type": "string",
    "features": [
        "filter_words",
        "engaging_questions",
        "patience",
        "linear_path_view",
        "next_steps",
        "sentiment_analysis",
        "engagement"
    ],
    "upload_url": "s3://ceems-file-bucket-dev/replay/2021/09/08
/422aa593-4d5b-4d8c-8048-76889831f68A/GMT20210908-
092751_Recording_ceeus_response.json",
    "respTopic": "topic_ceeus_gateway_response"
}
```

FIG. 4

ASYNCHRONOUS PIPELINE FOR ARTIFICIAL INTELLIGENCE SERVICE REQUESTS

FIELD OF INVENTION

The present invention relates generally to digital communication, and more particularly, to systems and methods for providing an asynchronous pipeline for artificial intelligence service requests.

SUMMARY

The appended claims may serve as a summary of this application.

BRIEF DESCRIPTION OF THE DRAWINGS

The present invention relates generally to digital communication, and more particularly, to systems and methods providing for an asynchronous pipeline for artificial intelligence (hereinafter "AI") service requests.

The present disclosure will become better understood from the detailed description and the drawings, wherein:

FIG. 4 is a diagram illustrating an example of a data payload for sending AI requests to an AI cluster.

DETAILED DESCRIPTION

Figure 1A:
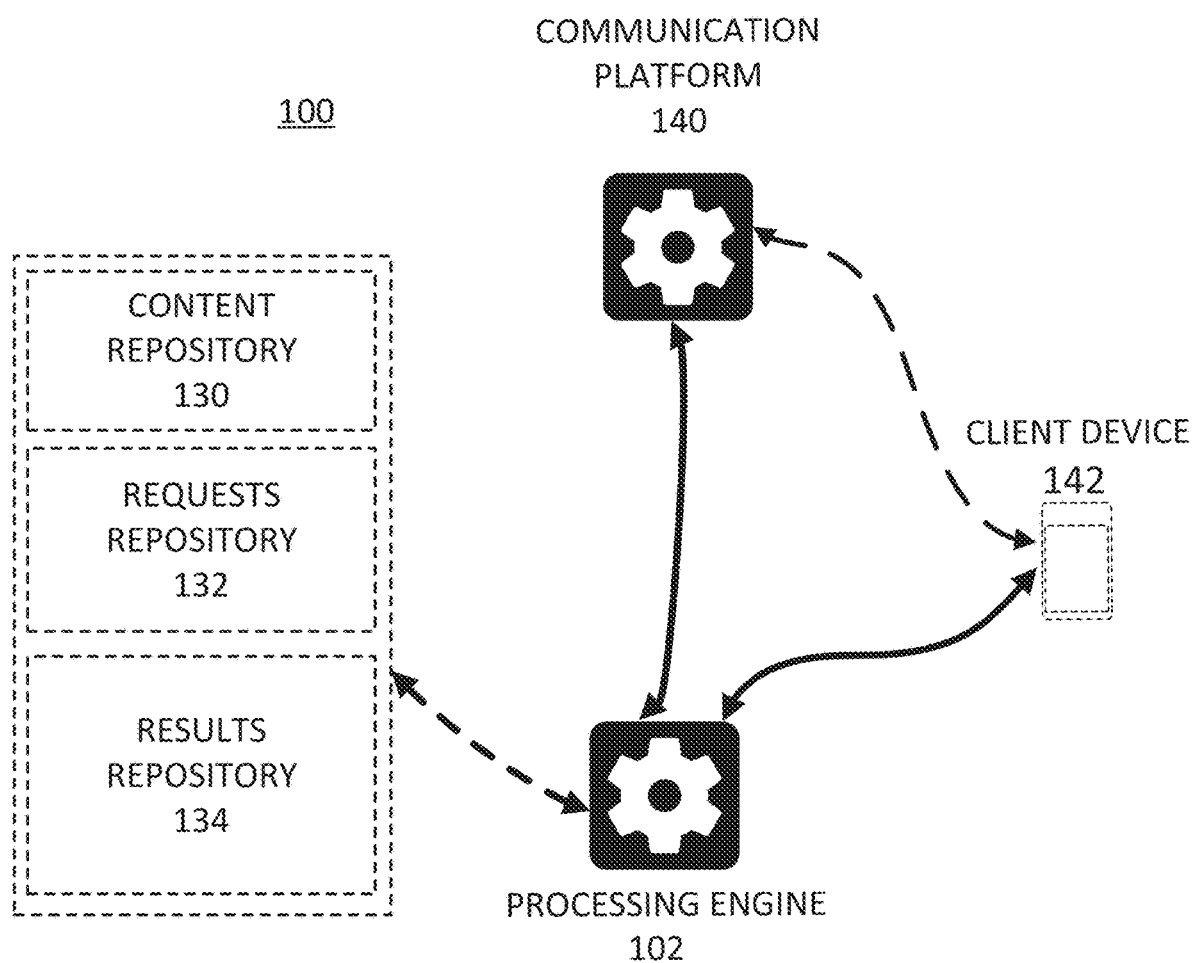
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

Currently, remote communication sessions do not provide post-meeting, or potentially in-meeting, intelligence and analytics with respect to, e.g., the session content, participants, individual participant performance based on various metrics within an organization. In order to facilitate such intelligence and analytics for sessions in an intelligent, automated way, a robust pipeline is necessary for artificial intelligence (hereinafter "AI") services to be requested, as well as for results to be returned for those requests.

A number of problems arise in facilitating such an AI pipeline. First, it is often very complex to know and keep track of where the end point is for each service, and difficult for various individual web services and/or web callers to separately request and receive results. Second, requests are often multi-tiered, such that one service request can have data dependencies with respect to another service request. In such a case, the result of a first request must be used as an input to a second request. Current requests are not coordinated in such a way to enable such a multi-tiered approach which respects data dependency requirements. Developers must therefore individually request and receive results in such a way that factors in data dependencies, which is burdensome, complex, and time-consuming. Lastly, for data security concerns it is critical to centralize the access of sensitive data so as to minimize potential data leak scenarios.

Thus, there is a need in the field of digital communication tools and platforms to create a new and useful system and method for providing an asynchronous pipeline for artificial intelligence service requests.

In one embodiment, the system receives, at a gateway service, access to content associated with a communication session; sends, to an artificial intelligence (AI) cluster including a number of AI services, a data payload, the data payload including a location to access the content and a number of requests for AI services to be performed by one or more AI models hosted on the AI cluster using the content as an input; receives one or more AI service results as the AI cluster completes the corresponding requests for the AI services; and stores each received AI service result in one or more databases.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment 100 in which some embodiments may operate. In the exemplary environment 100, a client device 142 is connected to a processing engine 102 and, optionally, a communication platform 140. The processing engine 102 is connected to the communication platform 140, and optionally connected to one or more repositories and/or databases, including, e.g., a content repository 130, a requests repository 132, and/or a results repository 134. One or more of the databases may be combined or split into multiple databases. The user's client device 142 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
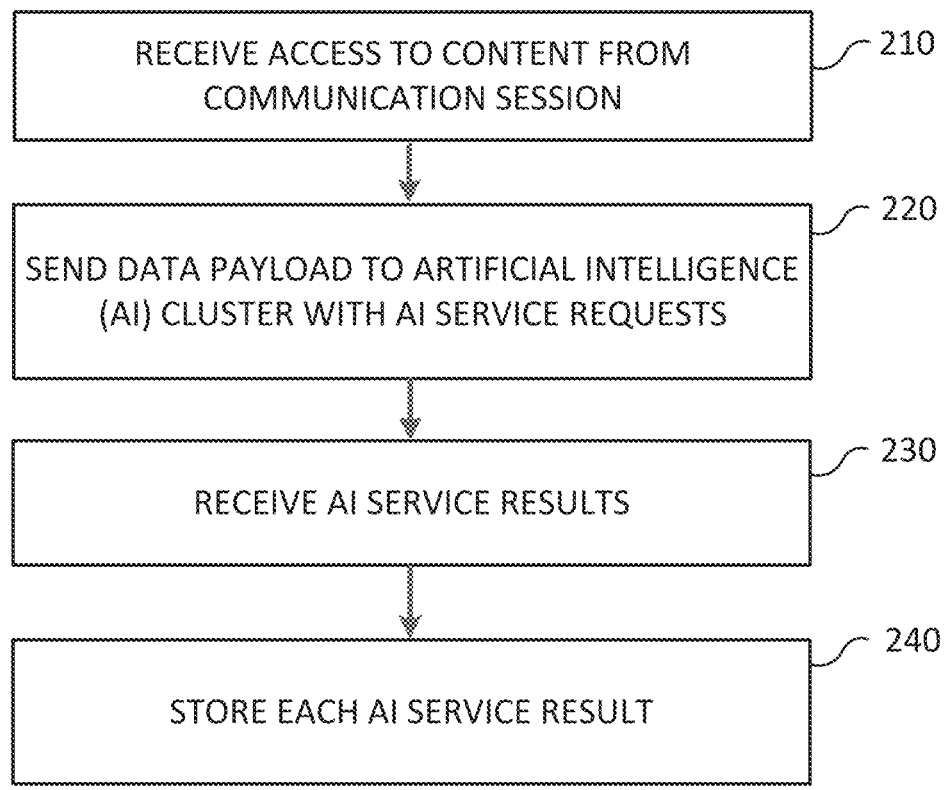
FIG. 2 is a flow chart illustrating an exemplary method that may be performed in some embodiments.

In an embodiment, the processing engine 102 may perform the exemplary method of FIG. 2 or other method herein and, as a result, provide an asynchronous pipeline for artificial intelligence service requests. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 142 is a device with a display configured to present information to a user of the device who is a participant of the video communication session. In some embodiments, the client device presents information in the form of a visual UI with multiple selectable UI elements or components. In some embodiments, the client device 142 is configured to send and receive signals and/or information to the processing engine 102 and/or communication platform 140. In some embodiments, the client device 142 is a computing device capable of hosting and executing one or more applications or other programs capable of sending and/or receiving information. In some embodiments, the client device 142 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 142. In some embodiments, one or more of the communication platform 140, processing engine 102, and client device 142 may be the same device. In some embodiments, the user's client device 142 is associated with a first user account within a communication platform, and one or more additional client device(s) may be associated with additional user account(s) within the communication platform.

In some embodiments, optional repositories can include a content repository 130, requests repository 132, and/or results repository 134. The optional repositories function to store and/or maintain, respectively, content associated with a communication session; AI service requests to be completed; and AI service results which have been provided upon requests being completed. The optional database(s) may also store and/or maintain any other suitable information for the processing engine 102 or communication platform 140 to perform elements of the methods and systems herein. In some embodiments, the optional database(s) can be queried by one or more components of exemplary environment 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
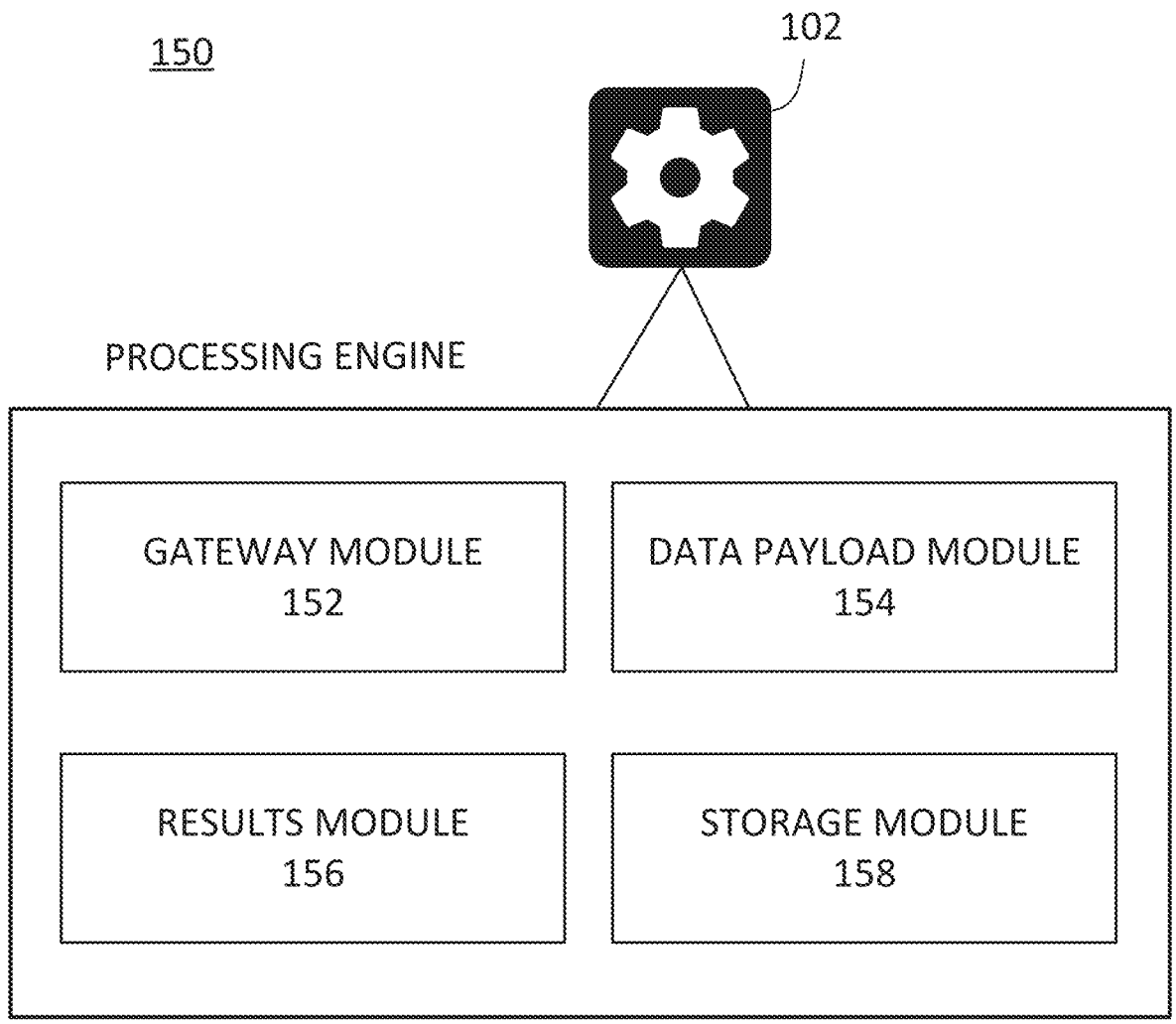
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Gateway module 152 functions to receive, at a gateway service, access to content associated with a communication session.

Data payload module 154 functions to send, to an AI cluster including a number of AI services, a data payload, the data payload including a location to access the content and a number of requests for AI services to be performed by one or more AI models hosted on the AI cluster using the content as an input.

Results module 156 functions to receive one or more AI service results as the AI cluster completes the corresponding request for that AI service.

Storage module 158 functions to store each received AI service result in one or more databases.

The above modules and their functions will be described in further detail in relation to an exemplary method below.

FIG. 2 is a flow chart illustrating an exemplary method that may be performed in some embodiments.

At step 210, the system receives, at a gateway service, access to content associated with a communication session. In some embodiments, the system receives the access to the content at a gateway service. The gateway service may consist of one or more processes configured to perform various services with respect to interfacing with different components within a service workflow, e.g., web services and web sites, servers configured to perform offline and/or online tasks, file servers, AI clusters, databases, and more. In some embodiments, the gateway service may be a process running on the same hardware as one or more other elements, such as, e.g., one or more AI services, AI clusters, or more. In some respects, the gateway service can serve as the "gateway" to traffic within the workflow, enabling, e.g., routing forwarding, flow restriction control, and more. In some embodiments, the gateway service acts to broker transactions between one or more client devices, cloud storage locations, and remote servers. In some embodiments, the gateway service will know the location of each AI service, how to call that service within the server architecture, send and/or receive one or more files such as, e.g., recordings, transcripts, AI service requests, AI service results, and more, and send results back to a publisher or web caller.

In some embodiments, the content may be one or more of: extracted audio from the communication session, a transcript generated from extracted audio, text, image, video, presentation materials, email, chat messages, or any other suitable content.

In some embodiments, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

In some embodiments, one or more audio and/or video recordings may be retrieved or captured from the communication session. The recording captures participants speaking with one another during the session, as well as the audio of, e.g., presenters, prepared presentations, audio or video recordings played back during the session, or any other audio which may have been produced during the session. In some embodiments, video is captured of the session content, and audio is extracted from the video recording within an isolated audio track or separate audio file.

In some embodiments, concurrently or subsequently to receiving access to the content, the system receives a "response topic" associated with the content. Within an asynchronous messaging queue or other asynchronous messaging platform, a publish-subscribe paradigm may be implemented wherein senders and receivers are decoupled from one another in synchronicity, such that one-to-many relationships are possible with respect to senders and receivers. Within such a paradigm, a response topic may be a string representing any topic on which the responses from the receivers of the message are expected. In some embodiments, an initial request (i.e., "publish" packet) is sent containing such a string. If the response topic contains a value, then the sender automatically identifies the corresponding request. Both the request and the response topic can have one or more subscribers. In some embodiments, the sender of the original request subscribes to the response topic before sending out the request. By subscribing, the sender of the request can receive updates to the response topic he or she has subscribed to. In some embodiments, this comes in the form of an asynchronous notification corresponding to the response topic that one or more AI service results are ready to access, as will be described in further detail below.

In some embodiments, the system processes extracted audio of the recording to generate a transcript of the communication session, which may also be received as content.

In some embodiments, the system generates a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript is generated in real-time during the session and also presented in real-time during the session.

In some embodiments, the system processes the extracted audio from a communication session to generate the transcript using one or more Automatic Speech Recognition (hereinafter "ASR") techniques. The system can be configured to send a message to an ASR server dedicated to performing ASR techniques with respect to audio and/or video recordings to generate transcribed text output of the recognized speech from the recordings. In some embodiments, the ASR server operates the ASR techniques offline to produce the resulting transcription output, then send or upload the output to one or more file servers or additional servers. In such cases, the ASR server can download the recording through, e.g., an Application Programming Interface (hereinafter "API") or other suitable method facilitating downloading of files on cloud storage. In some embodiments, a front end may be provided for such downloading of files for offline use. Once the file is downloaded, the audio can be processed according to ASR techniques.

In some embodiments, ASR techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

In some embodiments, the system trains an ML model by extracting a number of TM labels representing top phrases from each of a number of blocks of the utterances. In some embodiments, at least part of the training of the ML model comprises computing Term Frequency-Inverse Document Frequency ("TF-IDF") scores for words in the transcript. In some embodiments, at least part of the training of the ML model comprises using topic modeling training techniques to cluster the utterances into the blocks of utterances and to extract the TM labels from the blocks of utterances. In some embodiments, the ML model is trained in whole or in part using one or more of Non-Negative Matrix Factorization ("NMF") and Latent Dirichlet Allocation ("LDA").

In some embodiments, prior to training the ML model, the system parses and tags words in the transcript as parts of speech ("POS") within sentences via a pretrained natural language processing ("NLP") model. The training of the ML model is then performed using the parsed and tagged words in the transcript. In some embodiments, the pretrained NLP model is configured to perform Named Entity Recognition (NER).

At step 220, the system sends, to an artificial intelligence (AI) cluster including a number of AI services, a data payload and a location to access the content. In some embodiments, the data payload consists of a location to access the content and a number of requests for AI services to be performed by one or more AI models hosted on the AI cluster using the content as input.

One example of a data payload is shown with respect to FIG. 4. The example data payload in FIG. 4 is a string of text representing one or more requests. In some embodiments, this text is in the form of a markup script, such as, e.g., a JSON data file format. In some embodiments, a caller, such as a web service, sends the data payload requesting a multitude of AI service requests. The requests relate to multiple AI features which are present within the system, such as, e.g., within an AI cluster of services dedicated to fulfilling such AI service requests. The caller requests all such AI features at once within the payload. The combined result from the AI services will be sent back to the caller. The AI services requested by the caller are listed under "features", and in this example, include services relating to a variety of natural language processing (hereinafter "NLP") services which are performed on the generated transcript. The payload also includes a location ("download_url") to access the transcript for the record, allowing the system and/or AI cluster to download the transcript for processing and analysis.

In some embodiments, at least one of the requests for AI services has a data dependency with another pending request, such that the first request has a requirement that its input must be the output of the second request. In some embodiments, a configuration file (such as, e.g., a JSON file) and handling code is generated to handle the data flow dependency. In some embodiments, such configuration can be dynamically changed without code change, and a parser and the handling code are built in to handle the dependency defined by the configuration file.

In some embodiments, an example of a section from the configuration file for definition of data dependencies may be:

```
"engaging_questions": {
    "endpoint": "/engaging_questions",
    "service_host": "0.0.0.0",
    "service_port": 4460,
    "dependency_level": 1,
    "dependent_feature": null
},
"patience": {
    "endpoint": "/patience",
    "service_host": "0.0.0.0",
    "service_port": 4460,
    "dependency_level": 2,
    "dependent_feature": "engaging_questions"
},
```

In the above example, two data dependencies are defined, one for "engaging_questions" and one for "patience". For the "engaging_questions" definition, a dependency level of 1 is defined, with no dependent feature. For this definition, the service does not require the output from any other service to be performed. For the second definition, "patience" is defined with a dependency level of 2 and relies upon the output of feature "engaging_questions" to carry out its service. The data dependencies are defined so as to be carried out in a specific order based on these dependency requirements; thus, services with a dependency level of 1 must be performed first before services with a dependency level of 2 are performed.

At step 230, the system receives one or more initial AI service results as the AI cluster completes the corresponding requests for the AI services. In some embodiments, the AI service results are received asynchronously, and each result is received one at a time as they are individually completed. In other embodiments, a single, combined result including all of the AI service results is received when all of the AI services have been performed for the requests.

In some embodiments, the system receives a signal that at least one of the initial AI service results is being transmitted as an input to one or more additional requests having a data dependency on the initial AI service result. The system then receives one or more additional AI service results asynchronously as the AI cluster completes the corresponding request for that additional AI service.

At step 240, the system stores each received AI service result in one or more databases. The database(s) may be cloud storage locations, such as, for example, Amazon S3 or a similar cloud data service. In some embodiments, one or more AI service results are stored as a single combined AI service result, while in other embodiments, each individual AI service result is stored separately within one or more databases.

Figure 3:
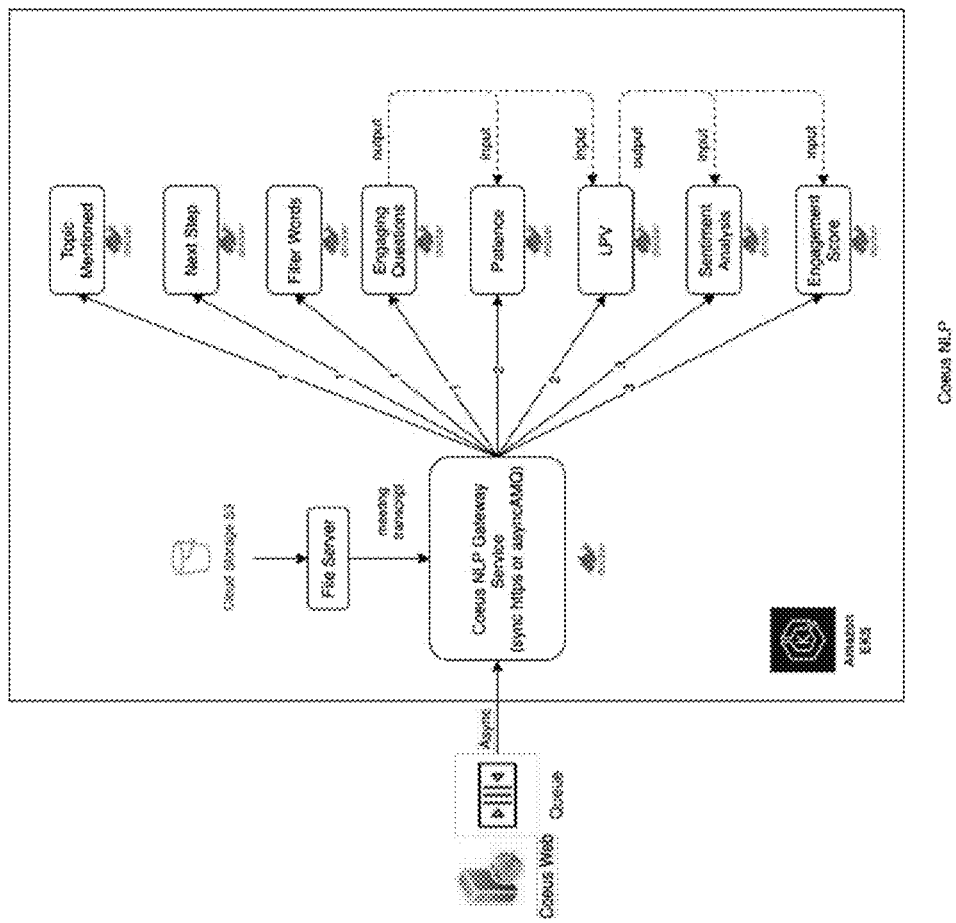
FIG. 3 is a flow chart illustrating one example embodiment for providing an asynchronous pipeline for AI service requests.

FIG. 3 is a flow chart illustrating one example embodiment for providing an asynchronous pipeline for AI service requests.

Within the illustrated gateway architecture, the Coeus NLP Gateway Service ("Gateway Service") interacts with the Coeus Web Service ("CWS"). The Gateway Service receives a data payload from CWS containing information AI service requests. In some embodiments, response topics for each service provide updates to CWS regarding the status of each NLP service, i.e., AI service that is being requested. A queue, which may be an asynchronous queue such as, e.g., an asynchronous message queue ("AMQ"), optional sync or asynchronous HTTP interface, is implemented for requests being sent to the Gateway Service.

The eight NLP services are shown branching off from the Gateway Service, and include "Topic Mentioned", "Next Step", "Filler Words", and more. Each of the NLP services has a data dependency level defined, i.e., Topic Mentioned has a data dependency of 1, LPV has a data dependency of 2, and Sentiment Analysis has a data dependency of 3. These three services must be executed in the specific numerical order of the data dependency level. This is because Sentiment Analysis depends on the output of LPV as its input, and LPV depends on the output of Engaging Questions as its input. These input and output dependencies are shown to the right of the NLP services.

Additionally, a File Server is shown, which the Gateway Service securely retrieves the meeting transcript, audio recording, or other important file(s) from. The File Server in turn obtains these file(s) from a Cloud Storage location, such as, e.g., Amazon S3, after proper user identification and permissions are confirmed. The Gateway Service is configured to download the transcript from the File Server one single time, then send the transcript to each service, receive an analysis or result, and send that result back to CWS.

In some embodiments, each service is individually containerized within, e.g., a Docker service object or other container service object. Since each container is running a different AI model, each has different requirements and some may require a more complex architecture. Since these complex architectures can be segregated via containerization of each feature, the container approach suits the complexity of the service flow.

Figure 5:
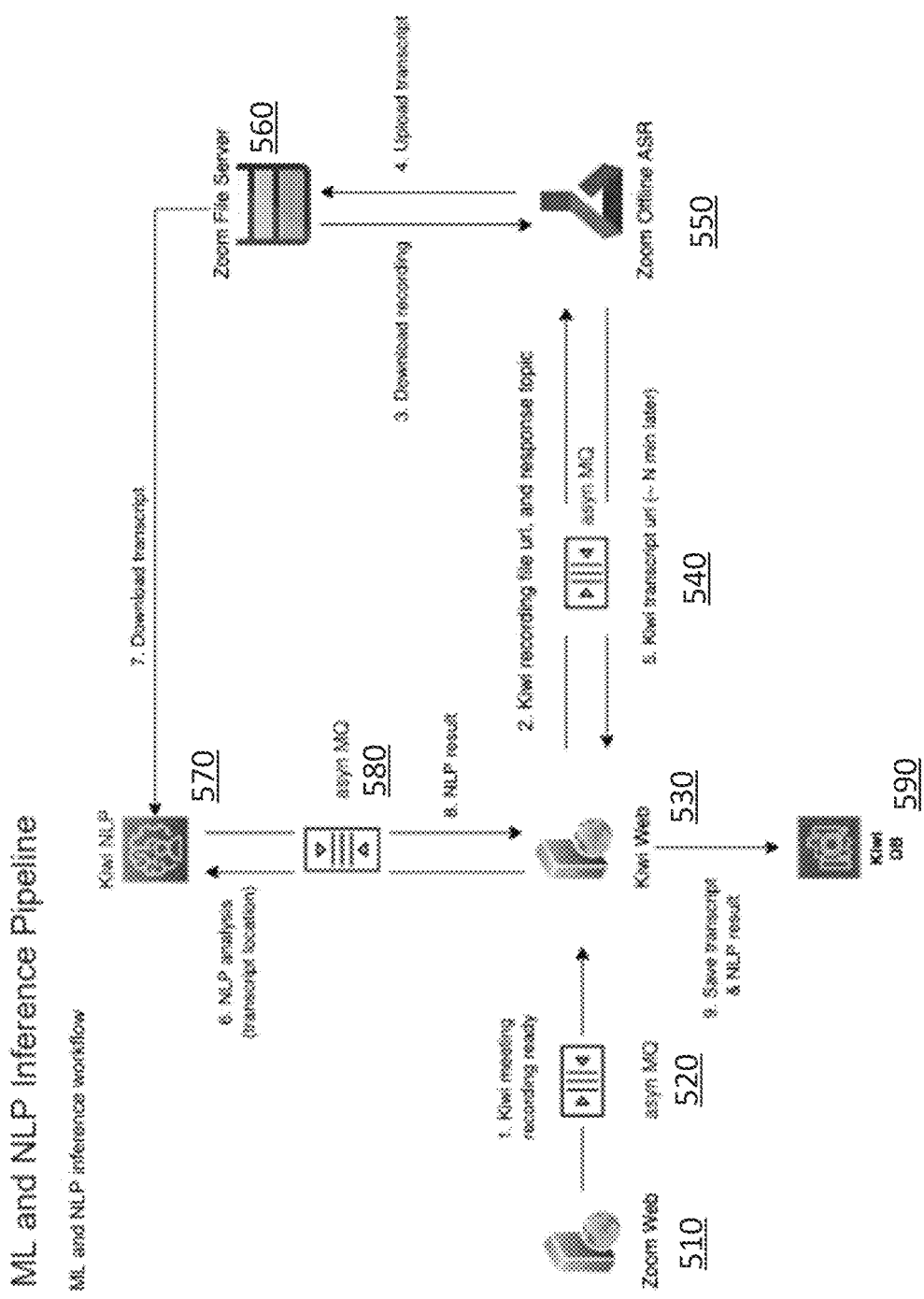
FIG. 5 is a flow chart illustrating one example embodiment for providing an asynchronous pipeline for AI service requests.

FIG. 5 is a flow chart illustrating one example embodiment for providing an asynchronous pipeline for AI service requests.

The Zoom Web Service 510 is a web service component that receives, via an asynchronous message queue ("async MQ") 520, a signal that a recording for a communication session is ready. The message includes the recording file location, as well as a response topic. The web service 510 sends the message to the Kiwi Web server 530 via the async MQ 520. A caller or publisher service performs publishing of the message, while a receiver or consumer service receives the message. The message may wait in the asynchronous message queue until it is ready to be received for processing. In some embodiments, a front end UI is provided for the message queue, which enables retrying the message if it fails to send.

Via another asynchronous message queue 540, the message is sent from the gateway web service 530 to an offline ASR server 550. The offline ASR server 550 downloads the recording from the recording location, and uploads a transcript of the recording to a file server 560. The file server provides cloud storage or other remote storage, such that a component can download any file through an API. The recording will be downloaded, and the ASR server 550 will transcribe the audio file into transcript text, upload it to the file server, and send the response back to the gateway web service 530.

The gateway web service 530 then sends the NLP analysis of the transcript to an AI (e.g., NLP) cluster 570, including the location of the transcript. The analysis will send requests for specific NLP features based on what is needed. The AI cluster 570 downloads the transcript, performs the service features based on the requests, then sends the result back to the gateway web service 530. The gateway web service 530 then stores the response in a database 590 to be searched for and retrieved by one or more web services.

Figure 6:
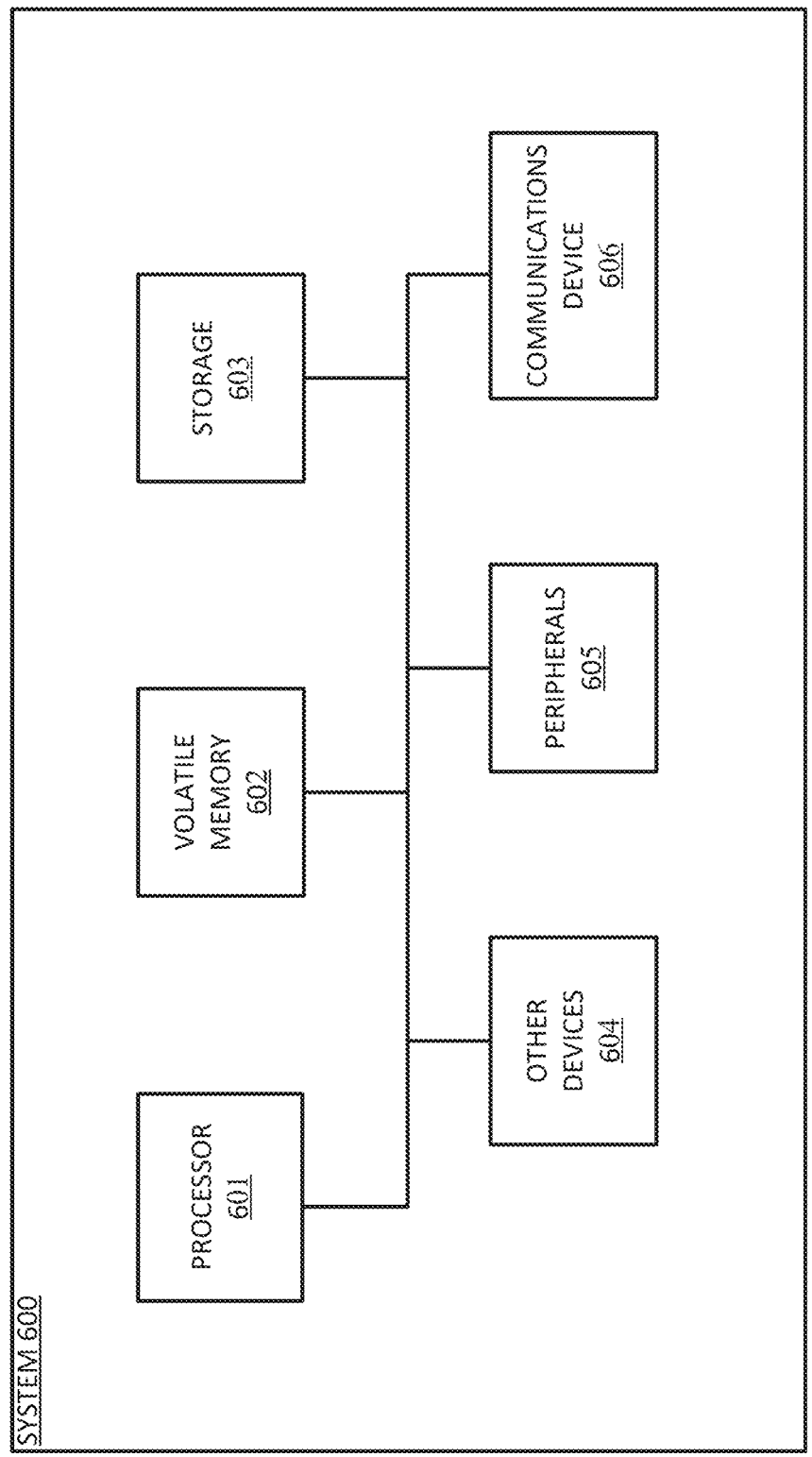
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 600 to an external medium. For example, communications device 606 may take the form of a network adapter that provides communications to a network. A computer 600 may also include a variety of other devices 604. The various components of the computer 600 may be connected by a connection medium such as a bus, crossbar, or network.

It will be appreciated that the present disclosure may include any one and up to all of the following examples.

Example 1. A method, comprising: receiving, at a gateway service, access to content associated with a communication session; sending, to an artificial intelligence (AI) cluster comprising a plurality of AI services, a data payload, the data payload comprising a location to access the content and a plurality of requests for AI services to be performed by one or more AI models hosted on the AI cluster using the content as an input, receiving one or more AI service results as the AI cluster completes the corresponding requests for the AI services; and storing each received AI service result in one or more databases.

Example 2. The method of example 1, wherein at least one of the AI service requests has a data dependency with another pending request, and further comprising: receiving a signal that at least one of the initial AI service results is being transmitted as an input to one or more additional requests having a data dependency on the initial AI service result; and receiving one or more additional AI service results as the AI cluster completes the corresponding request for that additional AI service.

Example 3. The method of any of examples 1-2, wherein the content comprises extracted audio from the communication session and a transcript of the communication session, the transcript being generated by processing the extracted audio from the communication session.

Example 4. The method of example 3, wherein processing the extracted audio to generate the transcript is performed using one or more Automatic Speech Recognition (ASR) techniques.

Example 5. The method of any of examples 3-4, wherein the processing the audio of the recording to generate the transcript is performed offline at a remote server.

Example 6. The method of any of examples 1-5, further comprising: concurrently to receiving access to the recording, receiving a response topic associated with the recording, receiving the one or more AI service results comprising receiving an asynchronous notification corresponding to the response topic that one or more of the AI service results are ready to access.

Example 7. The method of any of examples 1-6, wherein one or more of the receiving and/or sending steps are performed using one or more of: an asynchronous message queue (MQ), a synchronous HTTP interface, and/or an asynchronous HTTP interface.

Example 8. The method of any of examples 1-7, further comprising: sending, to the AI cluster, a data dependency file comprising definitions of data dependencies between the requests for AI services.

Example 9. The method of example 8, wherein the data dependency file comprises an assignment of a dependency level to each of the requests for AI services, the dependency level determining how many data dependencies the request has with respect to other requests.

Example 10. The method of example 9, wherein requests having a higher dependency level relative to other requests they depend upon are placed into a queue and performed after all the other requests they depend upon are completed, requests having the same dependency level being performed asynchronously with respect to one another.

Example 11. The method of any of examples 1-10, wherein each of the AI services is performed in whole or in part by one or more machine learning (ML) models, one or more machine vision (MV) models, and/or one or more natural language processing (NLP) models.

Example 12. The method of any of examples 1-11, wherein each of the AI services is separately containerized with respect to the other AI services.

Example 13. The method of any of examples 1-12, wherein at least one of the content and/or the AI service results are stored in one or more cloud storage locations.

Example 14. The method of any of examples 1-13, further comprising: receiving a signal that content associated with a communication session is ready for access; and sending the content to the AI cluster.

Example 15. The method of any of examples 1-14, further comprising: receiving modifications to a markup file handling a configuration of data flow dependency between requests; and reconfiguring the data flow dependency dynamically based on the modifications to the markup file without deployment of new code.

Example 16. A communication system comprising one or more processors configured to perform the operations of: receiving, at a gateway service, access to content associated with a communication session; sending, to an artificial intelligence (AI) cluster comprising a plurality of AI services, a data payload, the data payload comprising a location to access the content and a plurality of requests for AI services to be performed by one or more AI models hosted on the AI cluster using the content as an input, receiving one or more AI service results as the AI cluster completes the corresponding requests for the AI services; and storing each received AI service result in one or more databases.

Example 17. The communication system of any of examples 16, wherein at least one of the AI service requests has a data dependency with another pending request, the one or more processors being further configured to perform the operations of: receiving a signal that at least one of the initial AI service results is being transmitted as an input to one or more additional requests having a data dependency on the initial AI service result; and receiving one or more additional AI service results as the AI cluster completes the corresponding request for that additional AI service.

Example 18. The communication system of any of examples 16-17, wherein the content comprises extracted audio from the communication session and a transcript of the communication session, the transcript being generated by processing the extracted audio from the communication session.

Example 19. The communication system of example 18, wherein processing the extracted audio to generate the transcript is performed using one or more Automatic Speech Recognition (ASR) techniques.

Example 20. The communication system of any of examples 18-19, wherein the processing the audio of the recording to generate the transcript is performed offline at a remote server.

Example 21. The communication system of any of examples 16-20, further comprising: concurrently to receiving access to the recording, receiving a response topic associated with the recording, receiving the one or more AI service results comprising receiving an asynchronous notification corresponding to the response topic that one or more of the AI service results are ready to access.

Example 22. The communication system of any of examples 16-21, wherein one or more of the receiving and/or sending steps are performed using one or more of: an asynchronous message queue (MQ), a synchronous HTTP interface, and/or an asynchronous HTTP interface.

Example 23. The communication system of any of examples 16-22, further comprising: sending, to the AI cluster, a data dependency file comprising definitions of data dependencies between the requests for AI services.

Example 24. The communication system of example 23, wherein the data dependency file comprises an assignment of a dependency level to each of the requests for AI services, the dependency level determining how many data dependencies the request has with respect to other requests.

Example 25. The communication system of example 24, wherein requests having a higher dependency level relative to other requests they depend upon are placed into a queue and performed after all the other requests they depend upon are completed, requests having the same dependency level being performed asynchronously with respect to one another.

Example 26. The communication system of any of examples 16-25, wherein each of the AI services is performed in whole or in part by one or more machine learning (ML) models, one or more machine vision (MV) models, and/or one or more natural language processing (NLP) models.

Example 27. The communication system of any of examples 16-26, wherein each of the AI services is separately containerized with respect to the other AI services.

Example 28. The communication system of any of examples 16-27, wherein at least one of the content and/or the AI service results are stored in one or more cloud storage locations.

Example 29. The communication system of any of examples 16-28, further comprising: receiving a signal that content associated with a communication session is ready for access; and sending the content to the AI cluster.

Example 30. The communication system of any of examples 16-29, further comprising: receiving modifications to a markup file handling a configuration of data flow dependency between requests; and reconfiguring the data flow dependency dynamically based on the modifications to the markup file without deployment of new code.

Example 31. A non-transitory computer-readable medium containing instructions for generating a note with session content from a communication session, comprising: instructions for receiving, at a gateway service, access to content associated with a communication session; instructions for sending, to an artificial intelligence (AI) cluster comprising a plurality of AI services, a data payload, the data payload comprising a location to access the content and a plurality of requests for AI services to be performed by one or more AI models hosted on the AI cluster using the content as an input, receiving one or more AI service results as the AI cluster completes the corresponding requests for the AI services; and instructions for storing each received AI service result in one or more databases.

Example 32. The non-transitory computer-readable medium of example 31, wherein at least one of the AI service requests has a data dependency with another pending request, and further comprising: receiving a signal that at least one of the initial AI service results is being transmitted as an input to one or more additional requests having a data dependency on the initial AI service result; and receiving one or more additional AI service results as the AI cluster completes the corresponding request for that additional AI service.

Example 33. The non-transitory computer-readable medium of any of examples 31-32, wherein the content comprises extracted audio from the communication session and a transcript of the communication session, the transcript being generated by processing the extracted audio from the communication session.

Example 34. The non-transitory computer-readable medium of examples 33, wherein processing the extracted audio to generate the transcript is performed using one or more Automatic Speech Recognition (ASR) techniques.

Example 35. The non-transitory computer-readable medium of example 34, wherein the processing the audio of the recording to generate the transcript is performed offline at a remote server.

Example 36. The non-transitory computer-readable medium of any of examples 31-35, further comprising: concurrently to receiving access to the recording, receiving a response topic associated with the recording, receiving the one or more AI service results comprising receiving an asynchronous notification corresponding to the response topic that one or more of the AI service results are ready to access.

Example 37. The non-transitory computer-readable medium of any of examples 31-36, wherein one or more of the receiving and/or sending steps are performed using one or more of: an asynchronous message queue (MQ), a synchronous HTTP interface, and/or an asynchronous HTTP interface.

Example 38. The non-transitory computer-readable medium of any of examples 31-37, further comprising: sending, to the AI cluster, a data dependency file comprising definitions of data dependencies between the requests for AI services.

Example 39. The non-transitory computer-readable medium of example 38, wherein the data dependency file comprises an assignment of a dependency level to each of the requests for AI services, the dependency level determining how many data dependencies the request has with respect to other requests.

Example 40. The non-transitory computer-readable medium of example 39, wherein requests having a higher dependency level relative to other requests they depend upon are placed into a queue and performed after all the other requests they depend upon are completed, requests having the same dependency level being performed asynchronously with respect to one another.

Example 41. The non-transitory computer-readable medium of any of examples 31-40, wherein each of the AI services is performed in whole or in part by one or more machine learning (ML) models, one or more machine vision (MV) models, and/or one or more natural language processing (NLP) models.

Example 42. The non-transitory computer-readable medium of any of examples 31-41, wherein each of the AI services is separately containerized with respect to the other AI services.

Example 43. The non-transitory computer-readable medium of any of examples 31-42, wherein at least one of the content and/or the AI service results are stored in one or more cloud storage locations.

Example 44. The non-transitory computer-readable medium of any of examples 31-43, further comprising: receiving a signal that content associated with a communication session is ready for access; and sending the content to the AI cluster.

Example 45. The non-transitory computer-readable medium of any of examples 31-44, further comprising: receiving modifications to a markup file handling a configuration of data flow dependency between requests; and reconfiguring the data flow dependency dynamically based on the modifications to the markup file without deployment of new code.

Example 46. A method, including: receiving, at a gateway service from a web caller, access to content associated with a communication session and a request for a plurality of AI services, wherein the content includes a transcript that is downloaded only once by the gateway service, and wherein the request for the plurality of AI services specifies each AI service requested without defining an end point for each AI service requested; sending, to an artificial intelligence (AI) cluster including the plurality of AI services, a data payload, the data payload including a location to access the content, the transcript, and the request for a plurality of AI services to be performed by one or more AI models hosted on the AI cluster using the content as an input, wherein the data payload includes data dependency information for the plurality of AI services, and wherein the plurality of AI services includes at least topic mentioned, next step, filler words, engaging questions, patience, sentiment analysis, and engagement score; receiving results of the plurality of AI services as the AI cluster completes each request for AI services; and storing each received result of the plurality of AI services in one or more databases.

Example 47. The method of example 46, wherein at least one of the requested AI services has a data dependency with another pending request, and further including: receiving a signal that at least one of the results of the plurality of AI services is being transmitted as an input to one or more additional requests having a data dependency on the at least one of the results of the plurality of AI services; and receiving one or more additional results of the plurality of AI services as the AI cluster completes a corresponding request for that additional AI service.

Example 48. The method of example 46, wherein the content includes extracted audio from the communication session, the transcript being generated by processing the extracted audio from the communication session.

Example 49. The method of example 46, wherein processing the extracted audio to generate the transcript is performed using one or more Automatic Speech Recognition (ASR) techniques.

Example 50. The method of example 46, wherein processing the extracted audio from the communication session to generate the transcript is performed offline at a remote server.

Example 51. The method of example 46, further including: concurrently to receiving access to a recording of the communication session, receiving a response topic associated with the recording, wherein receiving the results of the plurality of AI services includes receiving an asynchronous notification corresponding to the response topic that one or more of the results of the plurality of AI services are ready to access.

Example 52. The method of example 46, wherein one or more of the receiving and/or sending steps are performed using one or more of: an asynchronous message queue (MQ), a synchronous HTTP interface, and/or an asynchronous HTTP interface.

Example 53. The method of example 46, further including: sending, to the AI cluster, a data dependency file including definitions of data dependencies between the requested plurality of AI services.

Example 54. The method of example 46, wherein the data dependency file includes an assignment of a dependency level to each of the requested plurality of AI services, the dependency level determining how many data dependencies the request has with respect to other requests.

Example 55. The method of example 46, wherein requests having a higher dependency level relative to other requests they depend upon are placed into a queue and performed after all the other requests they depend upon are completed, requests having a same dependency level being performed asynchronously with respect to one another.

Example 56. The method of example 46, wherein each of the AI services is performed in whole or in part by one or more machine learning (ML) models, one or more machine vision (MV) models, and/or one or more natural language processing (NLP) models.

Example 57. The method of example 46, wherein each of the AI services is separately containerized with respect to other AI services of the AI services.

Example 58. The method of example 46, wherein at least one of the content and the results of the plurality of AI services are stored in one or more cloud storage locations.

Example 59. The method of example 46, further including: receiving a signal that content associated with the communication session is ready for access; and sending the content to the AI cluster.

Example 60. The method of example 46, further including: receiving modifications to a markup file handling a configuration of data flow dependency between requests; and reconfiguring the data flow dependency dynamically based on the modifications to the markup file without deployment of new code.

Example 61. A communication system including one or more processors configured to perform operations of: receiving, at a gateway service from a web caller, access to content associated with a communication session and a request for a plurality of AI services, wherein the content includes a transcript that is downloaded only once by the gateway service, and wherein the request for the plurality of AI services specifies each AI service requested without defining an end point for each AI service requested; sending, to an artificial intelligence (AI) cluster including the plurality of AI services, a data payload, the data payload including a location to access the content, the transcript, and the request for a plurality of AI services to be performed by one or more AI models hosted on the AI cluster using the content as an input, wherein the data payload includes data dependency information for the plurality of AI services, and wherein the plurality of AI services includes at least topic mentioned, next step, filler words, engaging questions, patience, sentiment analysis, and engagement score; receiving results of the plurality of AI services as the AI cluster completes each request for AI services; and storing each received result of the plurality of AI services in one or more databases.

Example 62. The method of example 61, wherein at least one of the requested AI services has a data dependency with another pending request, the one or more processors being further configured to perform the operations of: receiving a signal that at least one of the results of the plurality of AI services is being transmitted as an input to one or more additional requests having a data dependency on the at least one of the results of the plurality of AI services; and receiving one or more additional results of the plurality of AI services as the AI cluster completes a corresponding request for that additional AI service.

Example 63. The method of example 61, further including: concurrently to receiving access to the content, receiving a response topic associated with a recording of the communication session; and asynchronously receiving the results of the one or more AI services including receiving an asynchronous notification corresponding to the response topic that one or more of the results of the plurality of AI services are ready to access.

Example 64. The method of example 61, wherein one or more of the receiving or sending steps are performed using one or more of: an asynchronous message queue (MQ), a synchronous HTTP interface, and/or an asynchronous HTTP interface.

Example 65. A non-transitory computer-readable medium including: instructions for receiving, at a gateway service from a web caller, access to content associated with a communication session and a request for a plurality of AI services, wherein the content includes a transcript that is downloaded only once by the gateway service, and wherein the request for the plurality of AI services specifies each AI service requested without defining an end point for each AI service requested; instructions for sending, to an artificial intelligence (AI) cluster including the plurality of AI services, a data payload, the data payload including a location to access the content, the transcript, and the request for a plurality of AI services to be performed by one or more AI models hosted on the AI cluster using the content as an input, wherein the data payload includes data dependency information for the plurality of AI services, and wherein the plurality of AI services includes at least topic mentioned, next step, filler words, engaging questions, patience, sentiment analysis, and engagement score; instructions for receiving results of the plurality of AI services as the AI cluster completes each request for AI services; and instructions for storing each received result of the plurality of AI services in one or more databases.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
receiving, at a gateway service from a web caller, access to content associated with a communication session and a request for a plurality of AI services, wherein the content includes a transcript that is downloaded only once by the gateway service, and wherein the request for the plurality of AI services specifies each AI service requested without defining an end point for each AI service requested;
sending, to an artificial intelligence (AI) cluster comprising the plurality of AI services, a data payload, the data payload comprising a location to access the content, the transcript, and the request for a plurality of AI services to be performed by one or more AI models hosted on the AI cluster using the content as an input, wherein the data payload includes data dependency information for the plurality of AI services, and wherein the plurality of AI services includes at least topic mentioned, next step, filler words, engaging questions, patience, sentiment analysis, and engagement score;
receiving results of the plurality of AI services as the AI cluster completes each request for AI services; and
storing each received result of the plurality of AI services in one or more databases.

2. The method of claim 1, wherein at least one of the requested AI services has a data dependency with another pending request, and further comprising:
receiving a signal that at least one of the results of the plurality of AI services is being transmitted as an input to one or more additional requests having a data dependency on the at least one of the results of the plurality of AI services; and
receiving one or more additional results of the plurality of AI services as the AI cluster completes a corresponding request for that additional AI service.

3. The method of claim 1, wherein the content comprises extracted audio from the communication session, the transcript being generated by processing the extracted audio from the communication session.

4. The method of claim 3, wherein processing the extracted audio to generate the transcript is performed using one or more Automatic Speech Recognition (ASR) techniques.

5. The method of claim 3, wherein processing the extracted audio from the communication session to generate the transcript is performed offline at a remote server.

6. The method of claim 1, further comprising:
concurrently to receiving access to a recording of the communication session, receiving a response topic associated with the recording,
wherein receiving the results of the plurality of AI services comprises receiving an asynchronous notification corresponding to the response topic that one or more of the results of the plurality of AI services are ready to access.

7. The method of claim 1, wherein one or more of the receiving and/or sending steps are performed using one or more of: an asynchronous message queue (MQ), a synchronous HTTP interface, and/or an asynchronous HTTP interface.

8. The method of claim 1, further comprising:
sending, to the AI cluster, a data dependency file comprising definitions of data dependencies between the requested plurality of AI services.

9. The method of claim 8, wherein the data dependency file comprises an assignment of a dependency level to each of the requested plurality of AI services, the dependency level determining how many data dependencies the request has with respect to other requests.

10. The method of claim 9, wherein requests having a higher dependency level relative to other requests they depend upon are placed into a queue and performed after all the other requests they depend upon are completed, requests having a same dependency level being performed asynchronously with respect to one another.

11. The method of claim 1, wherein each of the AI services is performed in whole or in part by one or more machine learning (ML) models, one or more machine vision (MV) models, and/or one or more natural language processing (NLP) models.

12. The method of claim 1, wherein each of the AI services is separately containerized with respect to other AI services of the AI services.

13. The method of claim 1, wherein at least one of the content and the results of the plurality of AI services are stored in one or more cloud storage locations.

14. The method of claim 1, further comprising:
receiving a signal that content associated with the communication session is ready for access; and
sending the content to the AI cluster.

15. The method of claim 1, further comprising:
receiving modifications to a markup file handling a configuration of data flow dependency between requests; and
reconfiguring the data flow dependency dynamically based on the modifications to the markup file without deployment of new code.

16. A communication system comprising one or more processors configured to perform operations of:
receiving, at a gateway service from a web caller, access to content associated with a communication session and a request for a plurality of AI services, wherein the content includes a transcript that is downloaded only once by the gateway service, and wherein the request for the plurality of AI services specifies each AI service requested without defining an end point for each AI service requested;

sending, to an artificial intelligence (AI) cluster comprising the plurality of AI services, a data payload, the data payload comprising a location to access the content, the transcript, and the request for a plurality of AI services to be performed by one or more AI models hosted on the AI cluster using the content as an input, wherein the data payload includes data dependency information for the plurality of AI services, and wherein the plurality of AI services includes at least topic mentioned, next step, filler words, engaging questions, patience, sentiment analysis, and engagement score;

receiving results of the plurality of AI services as the AI cluster completes each request for AI services; and storing each received result of the plurality of AI services in one or more databases.

17. The communication system of claim 16, wherein at least one of the requested AI services has a data dependency with another pending request, the one or more processors being further configured to perform the operations of:

receiving a signal that at least one of the results of the plurality of AI services is being transmitted as an input to one or more additional requests having a data dependency on the at least one of the results of the plurality of AI services; and receiving one or more additional results of the plurality of AI services as the AI cluster completes a corresponding request for that additional AI service.

18. The communication system of claim 16, further comprising:

concurrently to receiving access to the content, receiving a response topic associated with a recording of the communication session; and asynchronously receiving the results of the one or more AI services comprising receiving an asynchronous notification corresponding to the response topic that one or more of the results of the plurality of AI services are ready to access.

19. The communication system of claim 16, wherein one or more of the receiving or sending steps are performed using one or more of: an asynchronous message queue (MQ), a synchronous HTTP interface, and/or an asynchronous HTTP interface.

20. A non-transitory computer-readable medium comprising:

instructions for receiving, at a gateway service from a web caller, access to content associated with a communication session and a request for a plurality of AI services, wherein the content includes a transcript that is downloaded only once by the gateway service, and wherein the request for the plurality of AI services specifies each AI service requested without defining an end point for each AI service requested;

instructions for sending, to an artificial intelligence (AI) cluster comprising the plurality of AI services, a data payload, the data payload comprising a location to access the content, the transcript, and the request for a plurality of AI services to be performed by one or more AI models hosted on the AI cluster using the content as an input, wherein the data payload includes data dependency information for the plurality of AI services, and wherein the plurality of AI services includes at least topic mentioned, next step, filler words, engaging questions, patience, sentiment analysis, and engagement score;

instructions for receiving results of the plurality of AI services as the AI cluster completes each request for AI services; and instructions for storing each received result of the plurality of AI services in one or more databases.

* * * * *